(12) United States Patent
Lahti et al.

(10) Patent No.: US 11,503,948 B2
(45) Date of Patent: Nov. 22, 2022

(54) OVENABLE PACKAGE (71) Applicant: AMCOR FLEXIBLES NORTH AMERICA, INC., Neenah, WI (US)

(72) Inventors: Hanna-Mari Lahti, Lempäälä (FI); Kaisa P. Putkisto, Tampere (FI); Andrew J. Lischefski, Kangasala (FI); Kalle Ilmari Nättinen, Tampere (FI)

(73) Assignee: BEMIS COMPANY, INC., Neenah, WI (US)

( * ) Notice: Subject to any disclaimer, the term of this patent is extended or adjusted under 35 U.S.C. 154(b) by 0 days.

(21) Appl. No.: 16/762,941

(22) PCT Filed: Dec. 28, 2017

(86) PCT No.: PCT/US2017/068693
§ 371 (c)(1),
(2) Date: May 10, 2020

(87) PCT Pub. No.: WO2019/094057
PCT Pub. Date: May 16, 2019

(65) Prior Publication Data
US 2020/0305637 A1 Oct. 1, 2020

Related U.S. Application Data

(60) Provisional application No. 62/584,492, filed on Nov. 10, 2017.

(51) Int. Cl.
*A47J 36/02* (2006.01)
*A47J 36/24* (2006.01)
(Continued)

(52) U.S. Cl.
CPC ............... *A47J 36/02* (2013.01); *A47J 36/24* (2013.01); *B32B 27/08* (2013.01); *B32B 27/32* (2013.01); *B32B 27/34* (2013.01)

(58) Field of Classification Search
CPC ........... A47J 36/02; A47J 36/24; B32B 27/08; B32B 27/32; B32B 27/34
See application file for complete search history.

(56) References Cited

U.S. PATENT DOCUMENTS 4,455,184 A 6/1984 Thompson
4,543,280 A 9/1985 Fujita et al.
(Continued)

FOREIGN PATENT DOCUMENTS

EP 0245005 A2 11/1987
EP 0864415 A2 9/1998
(Continued)

OTHER PUBLICATIONS

Third Party Observations submitted in EP Application No. 17931598.1 dated Apr. 5, 2022, 13 pages.

*Primary Examiner* — Michael C Miggins (57) ABSTRACT

An ovenable tray composite comprises a polymeric based liner and a fiber based component. The polymeric based liner incorporates polyolefin materials for performance in both adhesion (during use) and separation (for disposal) from the fiber based component, as well as high temperature resistant polymers that allow for the entire tray composite to be ovenable. Packages made from the lined trays described herein can be used for packaging food items intended to be heated for cooking or reheating the contents.

18 Claims, 4 Drawing Sheets

(51) Int. Cl.
*B32B 27/08* (2006.01)
*B32B 27/32* (2006.01)
*B32B 27/34* (2006.01)

(56) References Cited

U.S. PATENT DOCUMENTS

| | | |
|---|---|---|
| 4,957,578 A | 9/1990 | Huffman et al. |
| 7,201,966 B2 | 4/2007 | Lischefski |
| 2004/0121049 A1 | 6/2004 | Ebner et al. |
| 2008/0145654 A1 | 6/2008 | Bednarik et al. |
| 2011/0086141 A1* | 4/2011 | Strilich .................. B65D 85/70 426/110 |
| 2015/0136764 A1 | 5/2015 | Dropsy et al. |
| 2019/0030857 A1* | 1/2019 | Fanfani .................. B32B 27/32 |

FOREIGN PATENT DOCUMENTS

| | | |
|---|---|---|
| EP | 1574328 A1 | 9/2005 |
| EP | 2300213 B1 | 7/2012 |
| EP | 2731885 B1 | 10/2016 |
| GB | 2115770 A | 9/1983 |
| JP | 05177775 A | 7/1993 |
| WO | 2008053205 A1 | 5/2008 |
| WO | 2015009518 A1 | 1/2015 |
| WO | 2015159217 A1 | 10/2015 |
| WO | 2017053937 A1 | 3/2017 |

\* cited by examiner

OVENABLE PACKAGE

TECHNICAL FIELD

This application is related to packaging suitable for oven cooking and reheating applications. Specifically, the packaging is composed of tray and lid components designed to hermetically seal a food component within.

BACKGROUND

Fiber based trays with polymeric based liners have been used for many applications. These applications include packaging for various items, including industrial or consumer goods products and food products. A fiber based component of the tray has advantages of low cost, low weight, recyclability, thermal insulation, tangible haptics and high stiffness. The polymer based liner is added to enhance the physical properties of the tray, including sealing properties, moisture resistance, gas barrier, grease and flavor resistance and durability.

Often, the fiber based component is coated with a thin layer of polyethylene to achieve the benefits of a polymeric liner. However, more functionality can be obtained by using a premade liner, and adhering it to the fiber based component. Premade liners, primarily made of polyethylene based polymers, are used in some applications where the fiber based component and the polymeric liner might be separated for disposal.

Fiber based trays that are designed for ovenable applications have used liners made of high temperature resistant polymers such as polyester and polyamide. Liners made of high temperature resistant polymers are difficult to adhere to the fiber based component and require an additional adhesive component between the fiber based component and the liner. Additionally, the high temperature resistant liners can be difficult to remove from the fiber based component once they are adhered.

SUMMARY

There is a need for a liner for a fiber based tray that 1) can be easily adhered to a fiber based component of the fiber based tray without additional adhesive components, 2) can survive oven temperatures and conditions without separating from the fiber based component and 3) can be easily separated from the fiber based component by peeling manually.

The present application describes a package suitable for cooking foods in a conventional oven. Specifically, the package comprises a tray and lid. The tray is a fiber based tray, lined with a polymeric film. The lid can be heat sealed to the lined surface of the tray composite to enclose a food product. The package can be used in ovenable cooking or reheating applications up to 220° C. Additionally, the liner may be separated from the fiber based component manually.

One embodiment of an ovenable tray composite has a polymeric based liner with i) an exterior surface layer comprising a polyester and ii) an interior surface layer comprising a polyolefin. The ovenable tray composite also has a fiber based component that is connected to the interior surface layer of the polymeric based liner. The polymeric based liner may also have at least one inner layer located between the exterior surface layer and the interior surface layer. The inner layer may contain a barrier polymer.

Another embodiment of an ovenable tray composite has a polymeric based liner with i) an exterior surface layer comprising a polyester, ii) a first inner layer comprising a first modified polyethylene (i.e. tie layer), iii) a second inner layer comprising a first polyamide, iv) a third inner layer, v) a fourth inner layer comprising a second polyamide independent of the first polyamide, vi) a fifth inner layer comprising a second modified polyethylene independent of the first modified polyethylene and vii) an interior surface layer comprising a polyolefin. The layers may be in the order listed here. The liner may have only the seven layers listed (i.e. no additional layers). The ovenable tray composite also has a fiber based component connected to the interior surface layer of the polymeric based liner. The third inner layer may contain a third modified polyethylene independent of the first and second modified polyethylenes. The third inner layer may contain an ethylene vinyl alcohol copolymer.

Any of the embodiments of the ovenable tray composite may have a polyolefin that is an ethylene vinyl acetate copolymer. The ethylene vinyl acetate copolymer may have a vinyl acetate content of at least 5% by weight. The ethylene vinyl acetate copolymer may have a vinyl acetate content of at least 12% by weight.

Any of the embodiments of the ovenable tray composite may have a polymeric based liner that is at least partially crosslinked. Some or all of the layers of the polymeric based liner may be coextruded.

In any of the embodiments of the ovenable tray composite the polymeric based liner may be removably affixed to the fiber based component. The polymeric based liner and the fiber based component may be manually separable. The force to separate the polymeric based liner and the fiber based component may be from about 10 N/m to 500 N/m.

In any of the embodiments of the ovenable tray composite the fiber based component may be a formable paper. The fiber based component may be an ovenable paperboard. In any embodiment, the polymeric based liner may be directly adjacent to the fiber based component.

Embodiments of a package have any one of the described embodiments of an ovenable tray composite, a lid and a food product. The food product is hermetically sealed between the lid and the exterior surface layer of the polymeric based liner. After exposure to 220° C. oven conditions for 45 minutes, the polymeric based liner may remain connected to the fiber based component to the same extent that the polymeric based liner and the fiber based component were connected prior to oven exposure. After exposure to 220° C. oven conditions for 45 minutes, the polymeric based liner may remain connected to the fiber based component over at least 80% of the area that the polymeric based liner and the fiber based component were connected prior to oven exposure.

Embodiments of the package may have a lid that is vacuum-formed over the food product. Some embodiments may have a second lid that is sealed to an exterior surface of the lid.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

The drawings show some but not all embodiments. The elements depicted in the drawings are illustrative and not necessarily to scale, and the same (or similar) reference numbers denote the same (or similar) features throughout the drawings.

DETAILED DESCRIPTION

A package configured for heating the packaged product in the oven is described herein. The package at least has an ovenable, fiber based tray composite and a lid that can be hermetically sealed to the tray. The product can be packaged and distributed for institutional use, catering or retail sale, through room temperature, refrigerated or frozen conditions. The package is designed to be able to withstand heating in an oven for either cooking or reheating the product packaged therein. The package is unique because it has a polyolefin containing liner, yet withstands oven conditions. The polyolefin content allows for easier package converting, without the use of an additional adhesive to adhere the liner to the fiber based tray component. After use, the tray components can be separated for easier recycling and disposal.

Figure 1:
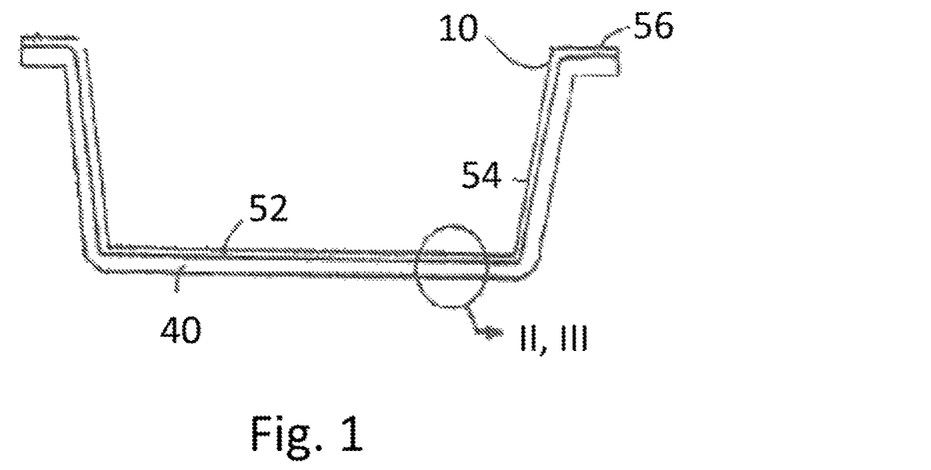
FIG. 1 is a cross-sectional view of an embodiment of a tray composite.

An embodiment of the trays described herein is shown in FIG. 1. The tray composite (50) may be a fiber based component (40) lined with a thin polymeric film (10), e.g., a polymer based liner. The fiber based component (40) in the tray composite (50) provides, among other things, the stiffness required for the tray, elevated sustainability compared to polymeric based materials, natural touch and thermal insulation. The tray composite (50) has a bottom (52), sidewalls (54) that extend from the bottom and a flange (56) that extends from the sidewalls (54) around the perimeter of the tray composite (50).

Figure 2:
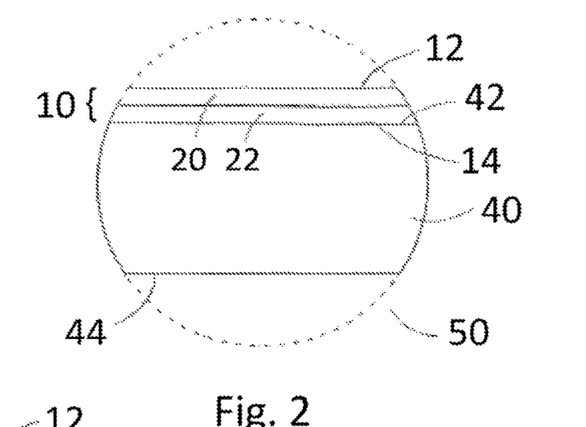
FIG. 2 is an exploded view of an embodiment of a composite tray material.
Figure 3:
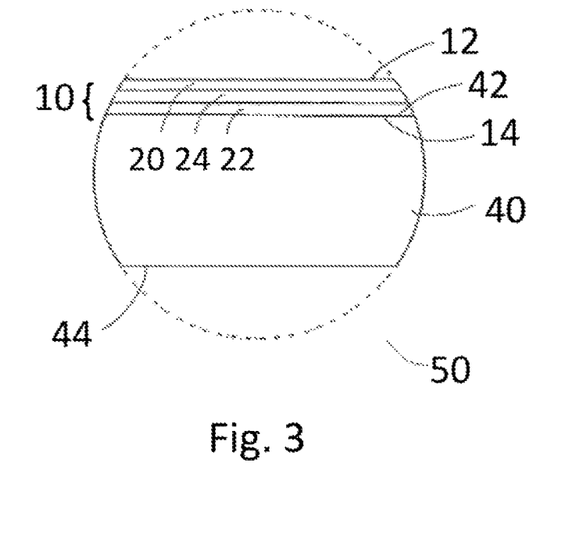
FIG. 3 is an exploded view of another embodiment of a composite tray material.

A cut-out portion of FIG. 1 is detailed in FIGS. 2 and 3. Both figures show embodiments of the tray composite (50) that have the fiber based component (40) directly connected to the polymeric based liner (10) at the interior surfaces of each (42 and 14, respectively). The exterior surface of the fiber based component (44) is opposite the interior surface of the fiber based component (42) and is located on the outside surface of the tray composite (50). The exterior surface of the polymeric based liner (12) is opposite the interior surface of the polymeric based liner (14) and is on the inside of the tray composite (50), and would be exposed to a product that may be packaged in the tray (not shown in FIG. 1, 2 or 3).

The embodiment of FIG. 2 has a polymeric liner (10) with two layers. The interior surface layer of the liner (22) is on the interior surface of the liner (14) and the exterior surface layer of the liner (20) is on the exterior surface of the liner (12). The embodiment of FIG. 3 has a polymeric liner (10) with the interior surface layer (22), the exterior surface layer (20) and a first inner layer (24) located between the exterior surface layer (20) and the interior surface layer (22).

Figure 4:
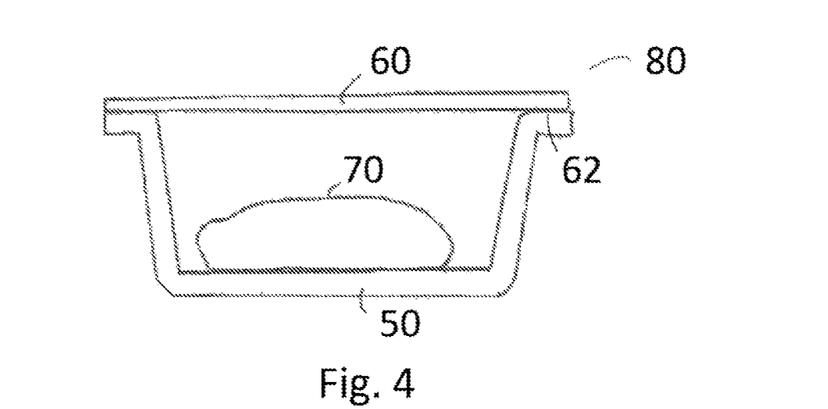
FIG. 4 is a cross-sectional view of an embodiment of a packaged product.
Figure 5:
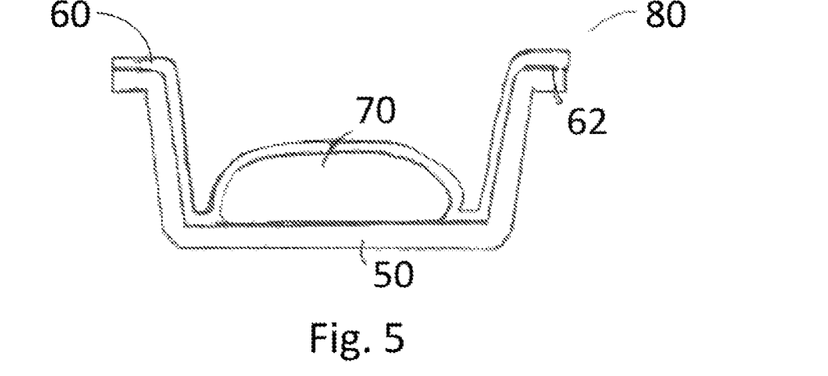
FIG. 5 is a cross-sectional view of another embodiment of a packaged product.
Figure 6:
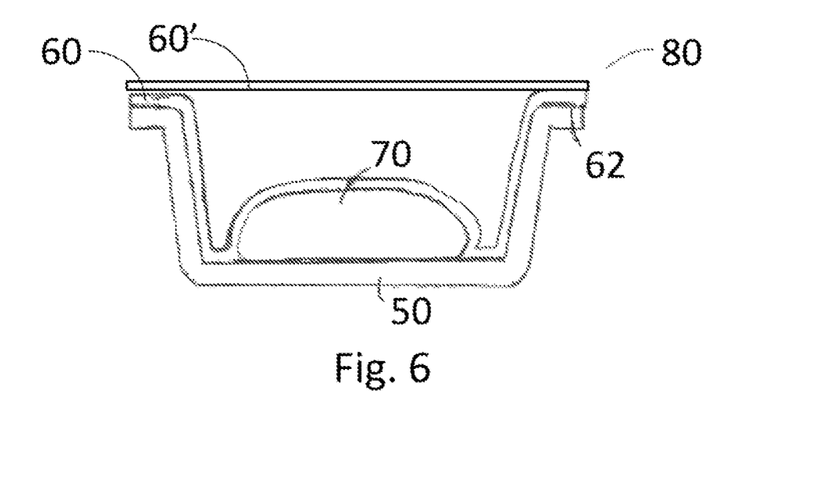
FIG. 6 is a cross-sectional view of another embodiment of a packaged product.

Exemplary embodiments of the packages described herein are shown in FIGS. 4, 5 and 6. A lid (60) can be sealed to the flange area of the tray composite (50) (i.e. a flat lid), as shown in FIG. 4, or a lid (60) can be applied using a vacuum skin packaging method (i.e. a VSP lid), as shown in FIG. 5. The lid (60) and the tray composite (50) are connected with a hermetic seal (62). Other alternatives could be used to apply a lid to the tray composite (50), as long as the packaged item (70) is enclosed between the tray composite (50) and the lid (60). The embodiment of FIG. 6 uses a second lid (60') partially connected to the exterior surface of the first lid (60).

The fiber based component of the tray can be, but is not limited to, paperboard, paper or other fiber based materials. The fiber based component can be a formable paper or a paperboard blank that can be folded into a tray type configuration. The fiber based component may be a part manufactured by a molded pulp process or a part produced directly of a natural raw material like wood or bamboo. The fiber based component may be a part manufactured from polymer fibers.

Formable papers, such as FibreForm® (available from BillerudKorsnä®) allow stretch and formability. Typically formable papers are available in grades with basis weight of 80, 100, 150 or 200 g/m$^2$.

The fiber based component may be a single layer or multiple layers. A multilayer fiber based component can be achieved by laminating paper layers.

The fiber based component may have a coating. Typical coatings for ovenable fiber based materials include clay or polyester. Clay pigment coatings typically contain white mineral or organic pigments, a polymeric latex binder and auxiliaries. The clay pigment coating generally provides a lightfast even surface for printing. The fiber based component may be printed, on one or both sides, with graphics or other indicia. The inks used for printing may be ovenable. The printed or coated fiber based component may be lacquered or waxed for improved mechanical and moisture resistance. However, it may be beneficial to maintain the exterior of the fiber based component breathable. Ovenable cardboard products such as PrintKote® are available from WestRock Company.

For some applications, the fiber based component, which may be ovenable, may be food contact compliant. Virgin sourced bleached pulps can be used, at least at the outer surfaces of the component. Food contact compliant coatings and inks can also be applied.

The fiber based component should have stiffness and rigidity suitable for the application. Cardboard based trays preferably have a basis weight above 200 g/m$^2$. Rigidity of the formable paper based component can be adjusted with the basis weight and density of the paper layer or the paper layers and the accompanying polymer based layers. The required rigidity is largely dependent on the application and the size/design of the tray.

Figure 7:
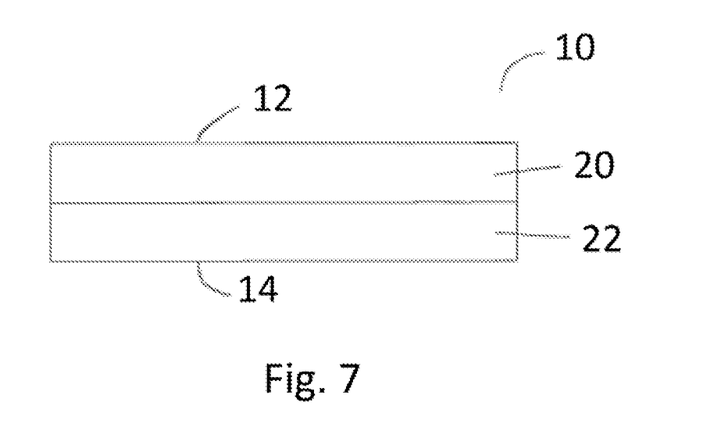
FIG. 7 is a cross-sectional view of an embodiment of a polymeric based liner.
Figure 8:
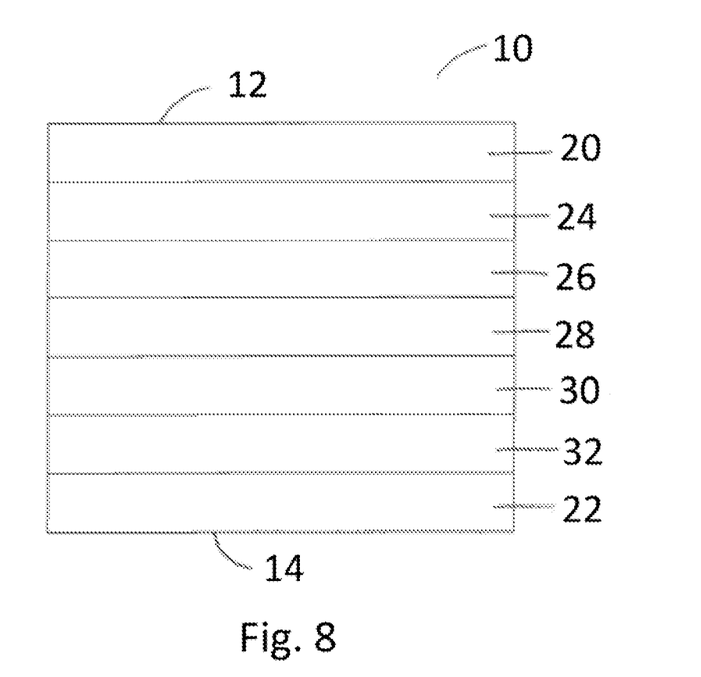
FIG. 8 is a cross-sectional view of another embodiment of a polymeric based liner.

The polymeric based liner (10) shown in cross-sectional drawings of FIGS. 7 and 8 can be a film that has an exterior surface layer (20) on the exterior surface (12) and an interior surface layer (22) on the interior surface (14). Preferably the exterior surface layer (20) on the exterior surface (12) comprises a polyester. Preferably the interior surface layer (22) on the interior surface (14) comprises an ethylene vinyl acetate (EVA) copolymer. The polymeric based liner (10) optionally contains any number of inner layers that may include polymers for functionality such as, but not limited to, interlayer adhesion (such as modified polyethylene tie layers), barrier (reducing transmission of oxygen, moisture or other chemical species), or structural enhancement (enhancing thermoformability, puncture strength, etc.). An embodiment shown in FIG. 8 has five inner layers (24, 26, 28, 30 & 32) and seven layers total.

In one embodiment, the liner structure of FIG. 8 has an exterior surface layer (20) comprising polyester, a first inner layer (24) comprising a first modified polyethylene, a second inner layer (26) comprising a first polyamide, a third inner layer (28), a fourth inner layer (30) comprising a second polyamide, a fifth inner layer (32) comprising a second modified polyethylene, and an interior surface layer (22) comprising an ethylene vinyl acetate copolymer. The third inner layer (28) may be a third modified polyethylene. The third inner layer (28) may be an ethylene vinyl alcohol copolymer. The first and second polyamide may be the same polyamide or they may be different polyamides. The first, second and third modified polyethylenes may be the same modified polyethylenes or they may be different.

As used herein, the term "layer" refers to a thickness of a material or blend of materials that may be continuous or discontinuous. As used herein, the phrase "surface layer" as applied to film layers of the present disclosure refers to any film layer having less than two of its principal surfaces directly adhered to another layer of the film. In contrast, the phrase "inner layer," as applied to film layers, refers to any film layer having both its principal surfaces directly adhered to another layer of the film. The polymeric based liner (10) can be produced using traditional film processing techniques such as blown film, cast film, or lamination. As used herein, the term "exterior surface" refers to a surface of the tray component (such as the fiber based tray component or the polymeric liner) that does not have contact with another tray component. Likewise, the "exterior surface layer" refers to the layer of the polymeric based liner that does not have contact with another tray component. The exterior surface layer of the polymeric based liner may have contact with other package components, such as the lid. As used herein, the term "interior surface" refers to a surface of the tray component that is in contact with another tray component (such as the surfaces of the fiber based component and the polymeric liner that are connected to each other). Likewise the "interior surface layer" refers to the layer of the polymeric based liner that is in contact with another tray component, such as the fiber based component.

Figure 9:
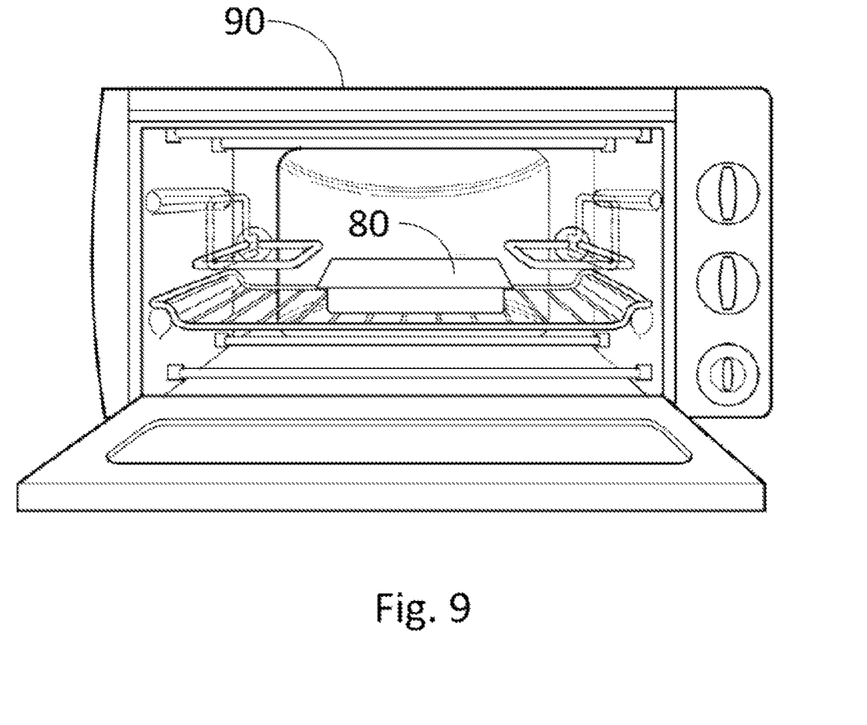
FIG. 9 is a view of an embodiment of a package in an oven.

The basic structure of the liner (10) and the process by which it is manufactured may be similar to that described in European Patent Specification EP1574328B1, filed Feb. 25, 2005, incorporated herein by reference. The liner may be further processed, as described below, to make it suitable for applications involving adherence to fiber based components and processing at oven conditions. The polymeric based liner provides adhesion to the fiber based component with heat, hermetic seals to the lid adequate shelf life for the product prior to oven heating and/or reheating, heat resistance (as a liner) up to 220° C. and is suitable for food contact through distribution and heating. FIG. 9 shows the package (80) inside an oven (90). As used in this application, a liner is heat resistant if it resists separation from the fiber based component while experiencing heat and potential pressure increase (pressure internal to a fully or partially sealed package). The liner can have a thickness from about 25 µm to 500 µm, or from about 50 µm to 300 µm.

The exterior surface of the polymeric based liner can be comprised of a polyester. As used throughout this application, the term "polyester" or "PET" refers to a homopolymer or copolymer having an ester linkage between monomer units. Polyesters may include a homopolymer or copolymer of alkyl-aromatic esters, including but not limited to polyethylene terephthalate (PET), amorphous polyethylene terephthalate (APET), polyethylene furanoate (PEF), glycol-modified polyethylene terephthalate (PETE), and polybutylene terephthalate (PBT); a copolymer of terephthalate and isophthalate including but not limited to polyethylene terephthalate/isophthalate copolymer, such as isophthalic acid (IPA) (modified polyethylene terephthalate (PETI)); a homopolymer or copolymer of aliphatic esters including but not limited to polylactic acid (PLA), polyglycolic acid (PGA); polyhydroxyalkonates including but not limited to polyhydroxypropionate, poly(3-(PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials. The exterior surface layer can comprise at least 50%, 60%, 70%, 80% or 90% polyester. Ideally, the exterior surface layer is comprised of at least 95% polyester.

The exterior surface layer of the liner can also be the layer that is connected to the lid and any other components of the package. As shown in the embodiment of FIG. 4, the lid (60) is connected to the tray composite (50) using a hermetic seal (62) at the flange of the tray. As shown in the embodiment of FIG. 5, the lid (60) is connected to the tray composite (50) using a hermetic seal (62) along the flange and portions of the sidewall and bottom of the tray. The hermetic seal may be formed by any known method including heat sealing, ultrasonic sealing, RF welding, etc. The bond between the lid (60) and the tray composite (50) may be manually peelable for removal at the time of use. The material of the exterior surface of the liner can be configured for appropriate bonding to the lid and other package components such that a hermetic package can be formed for enclosing the food product (70) therein.

Prior to bonding to the fiber based component, the interior surface of the polymeric based liner may be surface treated to increase the surface energy. As used herein, the phrase "surface treated" as applied to film layers refers to any technique which alters the surface energy (or surface tension) of a film layer and may include techniques such as, but is not limited to, corona, flame, and plasma treatment, ozone, ultra-high frequency electrical discharge, UV or laser bombardment, chemical priming, and the like. Surface treatment allows the polymeric based liner to be connected to the fiber based component of the tray, under heated conditions, without the use of an additional adhesive material. That is, the polymeric based liner may be directly connected to the fiber based component. In other words, the polymeric based liner may be adjacent to the fiber based component. In some embodiments the fiber based component is directly adjacent to the interior surface layer of the polymeric based liner. In some embodiments the polymeric based liner may be connected to and adjacent to the fiber based component. In some embodiments the interior surface layer of the polymeric based liner may be connected to and directly adjacent to the interior surface of the fiber based component. In one or more embodiments, the polymeric based liner and the fiber based component are connected and directly adjacent to each other. As used herein, "connected" or "directly connected" means that the components are attached to each other and would require a force to separate them. As used herein, "adjacent" or "directly adjacent" means that there is no intervening material between the components.

In one or more embodiments, the polymeric based liner may be removably affixed to the fiber based component. In one or more embodiments, the polymeric based liner is removably affixed directly to the fiber based component. The surface treatment of the interior surface of the liner should produce a surface tension of at least 36 dyne/cm (0.036 N/m), more preferably at least 38 dyne/cm (0.038 N/m).

The force required to separate the fiber based component of the tray and the interior surface of the liner can be high enough to survive the stresses of oven heating a product within the package, but low enough such that the two materials can be separated manually (peeled apart by hand). Separation of the tray components allows for disposal of each component in its own waste stream. Upon separation, the polymeric liner should stay completely intact and the fiber based component may experience some fiber tear. Some fibers may stick to the liner upon separation. A significant portion of the fiber based component may remain attached to the separated liner. Alternatively, the liner may separate cleanly from the fiber based component (no fiber tear). The separation of the liner from the fiber based component can be measured using tensile testing equipment according to ASTM F904. The force to separate the liner from the fiber based component can be from about 10 N/m to 500 N/m, or from about 20 N/m to 475 N/m, or from about 30 N/m to 450 N/m.

The interior surface layer (22) of the liner can comprise a polyolefin. As used herein, the term "polyolefin" refers to homopolymers or copolymers, including e.g. bipolymers, terpolymers, etc., having a methylene linkage between monomer units which may be formed by any method known to those skill in the art. Suitable examples of polyolefins include polyethylene, low density polyethylene, linear low density polyethylene, very low density polyethylene, ultra low density polyethylene, medium density polyethylene, high density polyethylene, ethylene/propylene copolymers, polypropylene, propylene/ethylene copolymer, polyisoprene, polybutylene, polybutene, ionomers and the like. The interior surface layer of the liner may comprise any polyolefin, preferably a polyethylene copolymer, more preferably, ethylene vinyl acetate copolymer. The interior surface layer can be at least 50% polyolefin or more preferably more than 90% polyolefin.

In some embodiments, the interior surface layer, and consequently the interior surface of the liner, can comprise an ethylene vinyl acetate (EVA) copolymer. As used throughout this application, the term "ethylene vinyl acetate" or "EVA" refers to copolymers comprised of repeating units of ethylene and vinyl acetate. Ethylene vinyl acetate copolymers may be represented by the general formula: $[(CH_2\text{-}CH_2)_n\text{—}((CH_2\text{-}CH(COO)(CH_3))_m]$. The vinyl acetate content may vary from less than 2% to greater than 95% by weight (of total EVA composition). The vinyl acetate content of EVA copolymers for packaging applications may vary from 2% to 40% by weight. Typically, the vinyl acetate content of EVA copolymers for packaging application can vary from about 2% to 28% by weight. Preferable embodiments of the tray composite and package include a liner with an interior surface layer that comprises an EVA copolymer with vinyl acetate content of at least 12%.

One or more of the optional inner layers of the liner could comprise a barrier polymer such as polyimide or EVOH. Barrier polymers or barrier materials are generally known to reduce the transmission of a gas or water vapor through the film. These materials may be required for some applications to preserve the packaged food product through distribution. For instance, in some cases moisture barrier is required to prevent a product from drying out (losing moisture content). In other cases, oxygen barrier is required to prevent ingress oxygen from degrading a product prematurely. Barrier materials are generally known in the industry and are typically used to preserve the quality of a product and extend the shelf life of the packaged product. Barrier materials are typically used for oxygen sensitive food products packaged in any number of ways including vacuum skin packaging (VSP) and modified atmosphere packaging (MAP).

Embodiments that include an oxygen barrier material may provide an oxygen transmission rate of less than about 1.0 $cm^3/100\ in^2/24$ h at 73° F., 0% RH and 1 atm or about 15.5 $cm^3/m^2/24$ h at 23° C., 0% RH and 1 atm), preferably, less than about 0.5 $cm^3/100\ in^2/24$ h at 73° F., 0% RH and 1 atm (or about 7.75 $cm^3/m^2/24$ h at 23° C., 0% RH and 1 atm), and most preferably, less than about 0.2 $cm^3/100\ in^2/24$ h at 73° F., 0% RH and 1 atm (or less than about 3.1 $cm^3/m^2/24$ h at 23° C., 0% RH and 1 atm).

As used throughout this application, the term "polyamide" or "PA" or "nylon" refers to a homopolymer or copolymer having an amide linkage between monomer units and formed by any method known in the art. Polyamides useful for the liner and package described herein may be similar to those described in European Patent Specification EP1574328B1, filed Feb. 25, 2005, incorporated herein by reference.

As used throughout this application, the term "ethylene vinyl alcohol copolymer" or "EVOH" refers to copolymers comprised of repeating units of ethylene and vinyl alcohol. Ethylene vinyl alcohol copolymers may be represented by the general formula $[(CH_2\text{—}CH_2)_n\text{—}(CH_2\text{—}CH(OH))_m]$. Ethylene vinyl alcohol copolymers may include saponified or hydrolyzed ethylene vinyl acetate copolymers. EVOH refers to a vinyl alcohol copolymer having an ethylene co-monomer and prepared by, for example, hydrolysis of vinyl acetate copolymers or by chemical reactions with vinyl alcohol. Ethylene vinyl alcohol copolymers may comprise from 28 mole percent (or less) to 48 mole percent (or greater) ethylene.

A preferred embodiment of the liner is produced by coextrusion. The exterior surface layer, the interior surface layer and any optional inner layers of the liner may be coextruded together (fully coextruded). Alternatively, any two or more adjacent layers could be coextruded together and the remaining layers subsequently added in a different processing step, such as adhesive lamination, extrusion lamination, or coating.

One of the optional inner layers could be an adhesive used to adhere the layers together. As used herein, the terms "adhere," "adhered" and "adheres," as applied to film layers or other components of the present invention, are defined as adhesion of the subject layer surface to another surface. The adhesive used could be of the type used for adhesive lamination or of the type used for coextrusion. Adhesion in coextruded layers is typically achieved by a modified polyolefin used as a tie layer. As used throughout this application, the term "modified" refers to a chemical derivative, such as one having any form of anhydride functionality (e.g., anhydride of maleic acid, crotonic acid, citraconic acid, itaconic acid, fumaric acid, etc.), whether grafted onto a polymer, copolymerized with a polymer or blended with one or more polymers. The term is also inclusive of derivatives of such functionalities, such as acids, esters and metal salts derived from such. Unless otherwise stated, the layer are preferably connected over the entire planar surfaces.

Any one layer, sub-set of the layers, or the entire liner could be either uniaxially or biaxially oriented.

The polymeric based liner may be subjected to a process that induces crosslinking within one or more of the polymer layers of the liner. The crosslinking can be achieved by any method, preferably irradiation from an electron beam generator. Crosslinking enhances the liner properties such that it can survive the conditions of oven cooking.

As used herein, the term "crosslinking" refers to the chemical reaction which results in the formation of bonds between polymer chains, such as, but not limited to, carbon-carbon bonds. Cross-linking may be accomplished by use of a chemical agent or combination thereof which may include, but is not limited to, for example, peroxide, silanes and the like, and ionizing radiation, which may include, but is not limited to, high energy electrons, gamma-rays, beta particles and ultraviolet radiation. The irradiation source can be an electron beam generator with a power output capable of supplying the desired dosage. The voltage can be adjusted to appropriate levels which may be, for example, 1-6 million volts or higher or lower. Many apparatus for irradiating films are known to those skilled in the art. In general, the most preferred amount of radiation is dependent upon the film structure and its total thickness. One method for determining the degree of "cross-linking" or the amount of radiation absorbed by a material is to measure the "gel content." As used herein, the term "gel content" refers to the relative extent of cross-linking within a polymeric material. Gel content is expressed as a relative percent (by weight) of the polymer having formed insoluble carbon-carbon bonds between polymers and may be determined by ASTM D-2765-01 Test. Method, which is incorporated herein by reference in its entirety.

The liner can be thermally laminated to a fiber based web. The resulting composite tray material can be subsequently formed into a tray by thermoforming, press forming or other similar techniques. Sufficient heat for lamination of the liner to the fiber based component can be applied to the relatively thin liner, meaning that the process is not dependent on the thickness of the fiber based component. The type and thickness of the fiber based component generally does not affect the speed or efficiency of the thermal lamination process. Heat can be applied to the liner in a number of ways including, but not limited to convection heating by an industrial oven or direct contact heating. Direct contact heating may provide the most controlled heating. One method of direct contact heating can be done simultaneously with the lamination by using a heated nip roller system at the point where the liner comes in contact with the fiber based component. The heated roller of the nipping system can be in contact with the exterior surface of the liner and the backing rollers are located on the exterior surface of the fiber based component. Lamination can be controlled by the heated roller temperature, line speed (dwell time) and nip pressure. A textured or banded heated nip roller may allow for spot-bonding of the liner to the fiber based component. This may allow for the provision of a peel tab at the edge of the tray component for ease of separation. In some embodiments, the liner is preferably connected to the fiber based component over the entire (or essentially the entire) planar surface of the tray component.

Optionally, the fiber based component of the tray can be pre-formed into the tray or receptacle configuration and the liner subsequently heated and formed into the tray configuration and simultaneously bonded to the fiber based component. Again, the liner can be heated by any methods. A particularly useful method is one that mimics the vacuum skin packaging (VSP) process used to apply lids to containers. In this case, there is no packaged item in the tray and the liner material is heated and vacuum formed into the tray, simultaneously connecting to the fiber based component. The liner can be connected to the fiber based component over the entire (or essentially the entire) interior surface.

Using the heating and connecting techniques described herein, the liner can be connected to the fiber based component without the assistance of an additional adhesive component. To enable the adhesive free connection process, the liner must have an interior surface that will bond to the fiber based component at a level that will survive the rigors of the application for which the tray is being used. In the embodiments described herein, the connection is enabled by using a polyolefin based interior surface layer on the liner. The use of an EVA copolymer as the interior surface layer of the liner and surface treatment of the interior surface of the liner also aid in achieving an adhesive-free connection suitable for oven heating applications without losing connection between the liner and the fiber based component. Additionally, the liner must have sufficient heat resistance to withstand the heating during connection to the fiber based component. In some of the embodiments described herein, the heat resistance is achieved by the use of polyester as the exterior surface of the liner as well as the at least partial cross-linking of the liner.

Figure 10:
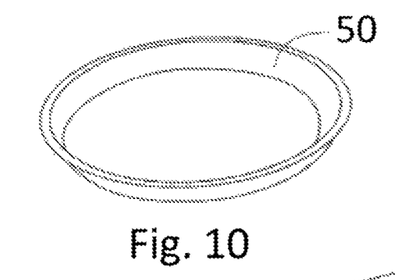
FIG. 10 is a view of an embodiment of a tray composite.
Figure 11:
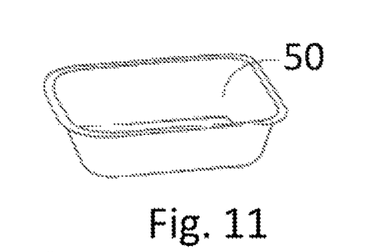
FIG. 11 is a view of another embodiment of a tray composite.
Figure 12:
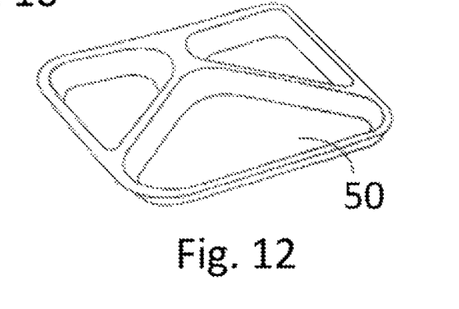
FIG. 12 is a view of another embodiment of a tray composite.

The tray composite may be a receptacle, having a bottom, sidewalls and a flange as shown in FIGS. 10, 11 and 12. The tray may have more than one compartment as shown in FIG. 12. It has also been contemplated that the tray composite is essentially a flat sheet with no formed areas. In this case, the lid is sealed to the tray composite in any location surrounding the packaged product.

The lid can be any type of lidding that can provide hermetic seals in combination with the sealant surface of the polymeric liner, adequate shelf life for the product prior to reheating and heat resistance up to 220° C. The seals described in this application may be formed by heat, impulse, ultrasonic, pressure or other seal-forming methods as known in the art. The lid may slightly or fully conform to the product within the package. The lid may be applied in a vacuum skin packaging (VSP) process or any other process known to the packaging industry. Multiple lids may be applied, such as a combination of a VSP lid (60) and a flat lid (60'), as shown in FIG. 6.

The lid may be of a polymeric material, fiber based material, metal based material or combinations thereof. The lid may provide barrier, puncture resistance, or any other type of characteristic that would aid in protecting the product packaged therein. The lid may be opaque or transparent (or any gradient of transparency) and may be tinted or otherwise pigmented. The lid may have printed indicia on either side or within the layers thereof. The lid may remain in a flat plane across the top of the tray (in a plane parallel to the tray flange). The lid may be applied in a VSP process, conforming to the product and tray contours. It is further contemplated that the lid may be identical, or similar to, the tray component as described herein. This would result in a clamshell type packaging configuration.

Some embodiments of the package may include other components. For example, the package may include a label on one or multiple sides of the package. Additionally, the package may include a piece of material that wraps around the package, further securing it and providing a means for labeling. Also envisioned is an additional snap on lid that fits over the flange of the tray, covering the lid that is heat sealed to the tray. This snap on lid can be used to reclose the package after the lid has been removed.

The packages described herein can be filled with a wide variety of products. The products may be, but are not limited to, any type of consumer or industrial item, food or medical product, pharmaceutical, or heatable therapeutic device. The products can be items that consumers will want to heat, reheat or cook in an oven or warming device. As used herein, the term "oven" or "ovenable" refers to the process of heating, by any means, with the intent of raising the temperature of, or cooking, the contents within the package. Typical means for heating include conventional ovens using radiant heat, convection style ovens and microwave ovens. The oven conditions described herein refer to the environment around the package (external heating) or interior to the package (heating the packaged product via microwave, for example). Prior to oven heating, the lid component of the tray can be fully removed, partially removed (venting) or remain fully connected to the tray. Intense heating cycles may cause lids that are still connected to partially or fully disconnect from the tray—this can depend on the product within. It was found that cooking performance was improved if the lids remained at least partially connected to the trays during cooking.

EXAMPLES

A fully coextruded polymeric based liner of the general structure of PET/modified polyethylene tie/nylon/modified polyethylene tie/nylon/modified polyethylene tie/EVA copolymer (shown in FIG. 8) was produced by conventional coextrusion methods. Details of the liner structure are provided in TABLE 1. The liner had a basis weight of 101.0 g/m$^2$. The EVA copolymer surface (interior surface, 14) of the liner was corona treated to achieve a surface tension of greater than 36 dyne/cm. The liner was subjected to electron beam irradiation to a dose of 85 kGy.

TABLE 1

Polymeric Based Liner Structure Details

| Layer (Reference numbers according to FIG. 8) | Composition | Layer Distribution, % by Volume |
|---|---|---|
| 20, liner exterior surface layer (sealant layer) | Polyester, 0.8 IV Slip additive Antiblock additive | 15% |
| 24, inner layer | EMA ULDPE MAgPE | 12% |
| 26, inner layer | Nylon 6 | 9% |
| 28, inner layer | ULDPE MAgPE | 13% |
| 30, inner layer | Nylon 6 | 9% |
| 32, inner layer | ULDPE MAgPE | 21% |
| 22, liner interior surface (connects to fiber based component) | EVA, 12 wt % vinyl acetate Slip, antiblock and processing aid additives | 21% |

EMA = ethylene methyl acrylate copolymer
ULDPE = ultra low-density polyethylene
MAgPE = maleic anhydride grafted polyethylene (modified polyethylene)

The liner samples were heated and subsequently thermoformed and bonded to a pre-assembled fiber based tray made from (A) an ovenable clay coated white cardboard, and (B) an ovenable PET coated white cardboard.

A piece of lasagna was loaded into each tray and ovenable lids were applied using a tray sealer, hermetically sealing the lasagna between the tray and lid as shown in FIG. 4. It was found that a liner identical to this, but subjected to electron beam irradiation dose of 120 kGy did not seal to the lid as well as the lower dose. The lid used for testing was Ovenrite® 40 (available from Bemis Co.) which is a lamination of a heat sealable biaxially oriented polyester film and a biaxially oriented polyimide film. Oven testing was completed in fan assisted ovens at 200° C. and 224° C. After extended periods of time in the oven, the packages were evaluated for performance.

After 75 minutes at 200° C., the packages had good appearance. The liners were adhered to the fiber based tray component and there was only minor venting in the seals that adhere the lid to the tray (the majority of the lid was still attached to the PET surface of the liner). After removing the trays from the oven, the lids were easily peeled from the trays and the food product was removed.

After 45 minutes at 220° C., the packages had good appearance. The liners were adhered to the fiber based tray component and the lids were mainly open.

An alternate production process was tested, including a thermal lamination of the liner material to a formable paper. Liners of the structure given in Table 1 were produced with A) no surface treatment and no crosslinking, B) surface treatment and no crosslinking and C) surface treatment and crosslinking. The surface treatment and crosslinking were completed as described above. These liners were thermally laminated to FibreForm® 150 (available from BillerudKorsnäs®).

It was found that lamination of liner A) resulted in low adhesion levels. An attempt to improve the adhesion between the liner and the formable paper was made by increasing the temperature. This high heat initiated crystallization in the polyester layers of the liner. In a partially crystalized state, the liner would be difficult to thermoform in a uniform manner.

Good adhesion between liners B) and C) were achieved, resulting in fiber tear when peeling the liner from the paper. Cups were successfully thermoformed from the thermal laminations using a two sided mold (only the male side was heated). Additionally, samples were vacuum formed into shallow trays for oven testing. The trays were filled with a risotto serving and sealed with an ovenable lid using sealing conditions of 150° C. and 1.5 seconds dwell. When heated in a conventional oven at 155° C. for 30 minutes, the trays became bloated with steam but the seals did not open. The lids were peeled off easily after removal from the oven and no discoloration was noticed. A second test was completed at 220° C. for 30 minutes. Here the seals did open prior to removal from the oven and the paper base was heavily discolored (browned). In both oven tests, the liner and the lamination between the liner and the paper were intact. No delamination was noticed. No degradation of the liner had occurred.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term this present application governs.

Unless otherwise indicated, all numbers expressing sizes, amounts, ranges, limits, and physical and other properties used in the present application are to be understood as being preceded in all instances by the term "about". Accordingly, unless expressly indicated to the contrary, the numerical parameters set forth in the present application are approximations that can vary depending on the desired properties sought to be obtained by a person of ordinary skill in the art without undue experimentation using the teachings disclosed in the present application.

The description, examples, embodiments, and drawings disclosed are illustrative only and should not be interpreted as limiting. The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention.

What is claimed is:

1. An ovenable tray composite that comprises:
   a) a polymeric based liner comprising:
      i) a sealing layer comprising a polyester, the sealing layer located at the exterior surface of the polymeric based liner; and
      ii) an interior surface layer comprising an ethylene vinyl acetate copolymer having a vinyl acetate content from 2% to 40% by weight;
   b) a fiber based component connected to the interior surface layer of the polymeric based liner.

2. An ovenable tray composite according to claim 1, wherein the ethylene vinyl acetate copolymer has a vinyl acetate content of at least 5% by weight.

3. An ovenable tray composite according to claim 1, wherein the ethylene vinyl acetate copolymer has a vinyl acetate content of at least 12% by weight.

4. An ovenable tray composite according to claim 1, wherein the polymeric based liner is at least partially cross-linked.

5. An ovenable tray composite according to claim 1, wherein all of the layers of the polymeric based liner are fully coextruded.

6. An ovenable tray composite according to claim 1, wherein the polymeric based liner is removably affixed to the fiber based component.

7. An ovenable tray composite according to claim 1, wherein the polymeric based liner and the fiber based component are manually separable.

8. An ovenable tray composite according to claim 1, wherein the force to separate the polymeric based liner and the fiber based component is from about 10 N/m to 500 N/m.

9. An ovenable tray composite according to claim 1, wherein the fiber based component is a formable paper.

10. An ovenable tray composite according to claim 1, wherein the fiber based component is an ovenable paperboard.

11. An ovenable tray composite according to claim 1, wherein the polymeric based liner is directly adjacent to the fiber based component.

12. An ovenable tray composite that comprises:
    a) a polymeric based liner comprising:
       i) an exterior surface layer comprising a polyester;
       ii) an interior surface layer comprising an ethylene vinyl acetate copolymer having a vinyl acetate content from 2% to 40% by weight; and
       iii) at least one inner layer located between the exterior surface layer and the interior surface layer; and
    b) a fiber based component connected to the interior surface layer of the polymeric based liner.

13. An ovenable tray composite according to claim 12, wherein the at least one inner layer comprises a barrier polymer.

14. A package comprising:
    a) an ovenable tray composite of claim 1;
    b) a lid; and
    c) a food product;
    wherein the food product is hermetically sealed between the lid and the exterior surface layer of the polymeric based liner.

15. A package according to claim 14, wherein after exposure to 220° C. oven conditions for 45 minutes, the polymeric based liner remains connected to the fiber based component to the same extent that the polymeric based liner and the fiber based component were connected prior to oven exposure.

16. A package according to claim 14, wherein after exposure to 220° C. oven conditions for 45 minutes, the polymeric based liner remains connected to the fiber based component over at least 80% of the area that the polymeric based liner and the fiber based component were connected prior to oven exposure.

17. A package according to claim 14, wherein the lid is vacuum-formed over the food product.

18. A package according to claim 17, wherein a second lid is sealed to an exterior surface of the lid.

* * * * *